United States Patent [19]

Rodin

[11] Patent Number: 4,928,209
[45] Date of Patent: May 22, 1990

[54] LIGHTING APPARATUS

[75] Inventor: Bruce W. Rodin, New York, N.Y.

[73] Assignee: Mirrorlite, Inc., New York, N.Y.

[21] Appl. No.: 239,173

[22] Filed: Aug. 31, 1988

[51] Int. Cl.⁵ .................................................. F21S 3/00
[52] U.S. Cl. .................................... 362/217; 362/221;
362/260; 362/247; 439/650; 439/226
[58] Field of Search ............... 362/217, 260, 255, 256,
362/220, 221, 147, 256, 372; 439/638, 640, 650,
651, 653, 654, 655, 226, 628

[56] References Cited

U.S. PATENT DOCUMENTS

| | | | |
|---|---|---|---|
| 2,446,461 | 8/1948 | Diver | 362/217 |
| 2,972,675 | 2/1961 | Schiffer | 439/239 |
| 4,336,576 | 6/1982 | Crabtree | 362/247 |
| 4,388,675 | 6/1983 | Lewin | 362/247 |
| 4,652,983 | 3/1987 | Mytels | 362/260 |
| 4,674,016 | 6/1987 | Gallagher | 362/217 |
| 4,719,546 | 1/1988 | Spitz | 362/260 |
| 4,799,134 | 1/1989 | Pinch et al. | 439/226 |

FOREIGN PATENT DOCUMENTS

| | | | |
|---|---|---|---|
| 237591 | 2/1962 | Australia | 362/217 |
| 638796 | 6/1950 | United Kingdom | 362/217 |

*Primary Examiner*—Ira S. Lazarus
*Assistant Examiner*—D. M. Cox
*Attorney, Agent, or Firm*—Cohen, Pontani & Lieberman

[57] ABSTRACT

Lighting apparatus for improving the efficiency of a fluorescent fixture. A high efficiency reflector having tube hangers depending therefrom is mounted into fixture housing. Substitute fluorescent tubes, one for each original pair of tubes, are mounted under reflectors and held by hangers. A device including a plug and a substitute socket is used to tap electricity from an original fixture socket and to conduct it to the substitute tube through the substitute socket which is itself supported by the substitute tube.

21 Claims, 3 Drawing Sheets

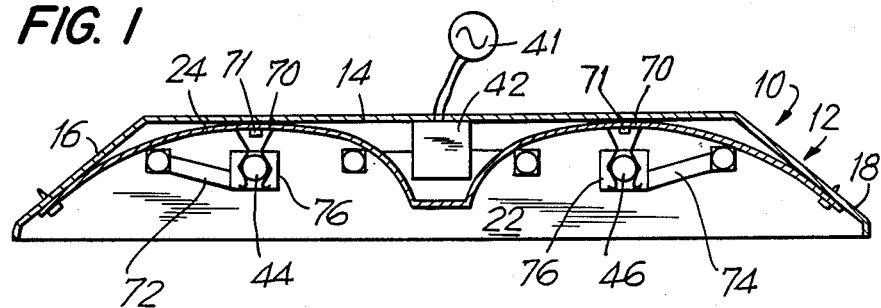
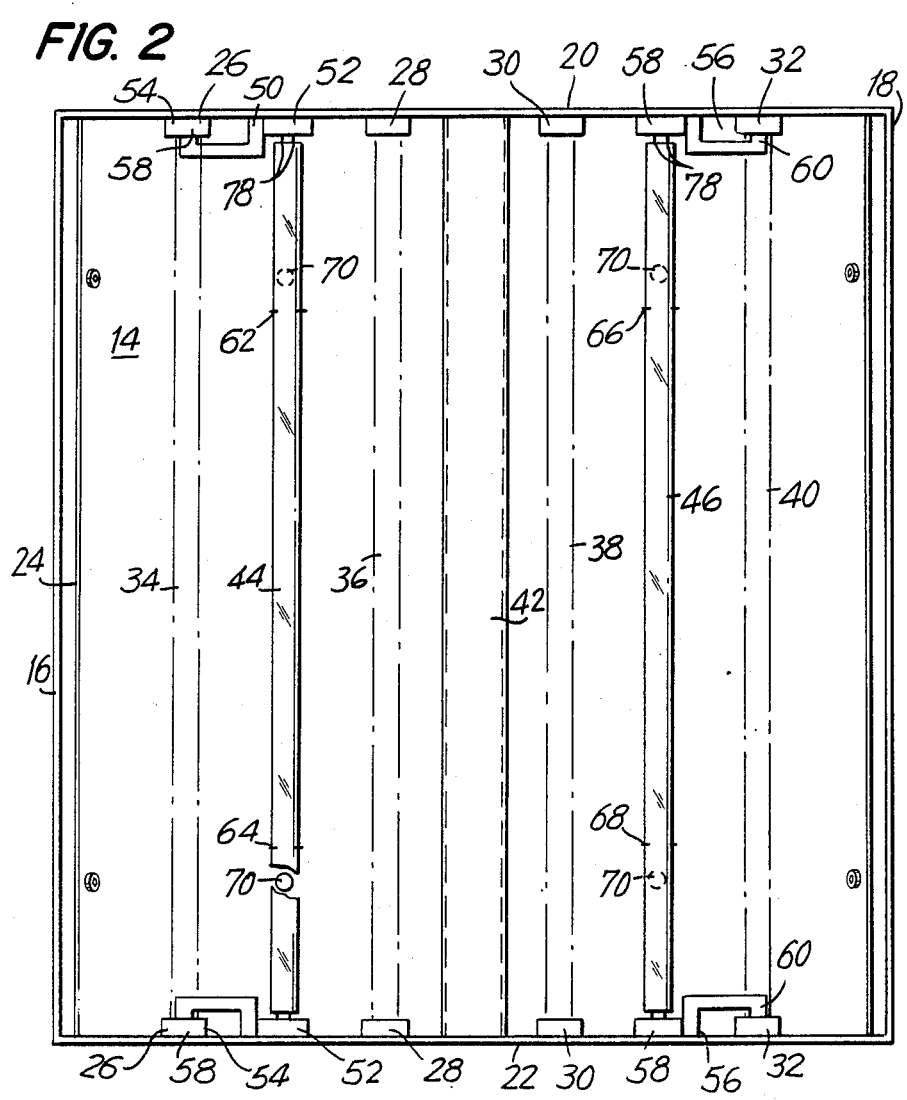

LIGHTING APPARATUS

BACKGROUND OF THE INVENTION

Fluorescent bulb tubes provide an efficient source of light. However, fluorescent tubes are generally employed in fixtures which include sheet metal housings of box-like configuration. Such housings tend to absorb a significant amount of the light efficiently produced by the fluorescent tube and to diffuse a significant other portion of the light so produced whereby to lower the overall efficiency of the system of the fluorescent tube and the fixture.

With the rising cost of energy encountered over the past decade or so, it becomes increasingly important to provide a fixture for fluorescent tubes or the like that takes greater advantage of the inherent efficiency of fluorescent bulbs or tubes. Indeed, most fluorescent fixtures are designed to utilize fluorescent tubes in pairs. It has been previously proposed to modify existing fluorescent fixtures so as to reduce the absorption of light by the fixture and its tendency to diffuse light to such a degree that the number of fluorescent tubes employed in the fixture can be halved without significantly reducing the amount of usable light produced by the modified fixture when compared with an unmodified fixture having twice the number of bulbs.

There have been previous attempts to achieve this goal, especially in U.S. Pat. No. 4,674,016, granted to Gallagher on June 16, 1987 for a Lighting Apparatus. In the Gallagher patent it is proposed to substitute one fluorescent tube for each pair in a fixture by tapping energy off of one of the original sockets and feeding that energy to a supplemental or additional socket for connection to the substitute single bulb per pair. Also employed in the Gallagher apparatus is a substitute reflector preferably shaped to simulate a parabolic reflector around the substitute bulb. The reflector is secured to the fixture housing by driving screws through the substitute socket and the ends of the reflector to secure the substitute socket and reflector to the housing. The substitute bulb is therefore held in the housing by the substitute socket which is screwed into the housing.

Experience with lighting apparatus of the type described and claimed in Gallagher has established that it is inconvenient to install and because of the construction of the portion of the apparatus for tapping energy from one of the original sockets to the additional socket, may not receive municipal government approval for such installation. Specifically, the problem of aligning the additional socket in the Gallagher apparatus so as to easily receive a substitute fluorescent bulb or tube is a difficult and time consuming one which has a significant impact on the overall labor costs for installing apparatus of the Gallagher type. Moreover, the apparatus for tapping electrical energy from the original socket and supplying it to the supplemental or additional socket includes exposed wiring which does not meet all municipal codes.

SUMMARY OF THE INVENTION

The present invention is directed toward improving the efficiency of fluorescent lighting fixtures to the extent that for each pair of bulbs in the fixture, one bulb may be omitted. Thus, the invention may be used for two tube troffers, four tube troffers or even larger fixtures. The invention is applicable to any length of fixture and tube such as two foot tubes, four or eight foot tubes, for example. Looking first at a two tube fixture, in the present invention, the two original spaced apart tubes are removed, a substitute reflector made out of a highly reflective metal such as a polished aluminum or the like proportioned to fit inside of a standard sheet metal housing is secured inside of said housing as by sheet metal screws or self-drilling screws extending through the sides of the reflector into sides of the housing. The reflector is preferably paraboloidal in shape so as to reduce the amount of diffusion normally inherent in a standard fluorescent fixture. For each substitute bulb to be employed in lieu of a pair of bulbs, the apparatus is provided with two depending hangers that are secured to the substitute reflector and depend therefrom for releasably holding the substitute fluorescent tube in the fixture, preferably in the space between the spaces for the two original tubes and at the focus of the paraboloid roughly defined thereby. It is the reflector and the hanger which support the bulb, not a substitute socket as in, for example, the Gallagher U.S. Pat. No. 4,674,016.

Like the Gallagher patent, power is drawn for the substitute bulb from an original socket to a substitute socket. Unlike Gallagher the substitute socket need not be secured to the housing of the fixture but, instead, is connected to the bulb and held in place by the bulb which is in turn held in place by the hangers. Thus, there is no need to pre-locate the substitute socket before disposing a substitute bulb in the fixture.

The pair of hangers is provided for each substitute tube which is substituted for a pair of original tubes. Thus, in a four bulb troffer, there will be two sets or two pairs of hangers, one pair for each of the two substitute tubes, which tubes are normally located in the space between the spaces for the pair of original bulbs in the unmodified fixture. Likewise, each substitute bulb will have a separate means for supplying power to the substitute bulb, that separate means constituting a separate substitute socket and a plug pluggable into an original socket for tapping the electrical energy supplied thereto. But as already noted, the location of the substitute socket is determined by the positioning of the substitute bulb rather than vice versa as in the Gallagher patent.

It is also presently preferred that the connection of the substitute bulb with its associated substitute socket be effected by a linear movement only, rather than the twisting movement normally employed in connecting a fluorescent tube to a socket. When so employed, the invention is even simpler to install.

BRIEF DESCRIPTION OF THE DRAWINGS

Referring now to the drawings:

FIG. 1 is a vertical sectional view of a standard fluorescent light fixture modified by the apparatus of the present invention;

FIG. 2 is a bottom plan view thereof;

DETAILED DESCRIPTION OF THE PRESENTLY PREFERRED EMBODIMENTS

Figure 3:
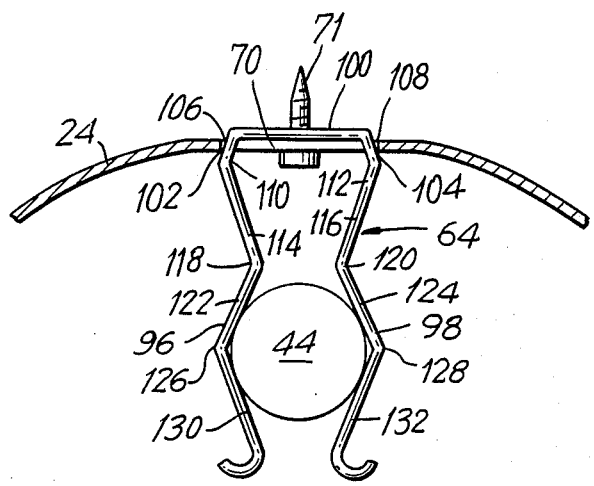
FIG. 3 is a fragmentary detailed sectional view showing a bulb hanger in elevation and connected to the substitute reflector at one end and a fluorescent tube at the other end.

A standard lighting fixture as modified by the presently preferred apparatus of this invention is shown generally in FIGS. 1 and 2. This lighting fixture, by way of example and not limitation, is a standard four-bulb lighting fixture 10 having a housing 12 including a top 14, two sides walls 16 and 18 and two end walls 20 and 22. While the housing 12 is shown with the side walls angled inwardly to yield a cross-sectional shape that is substantially trapezoidal, the shape of the standard housing may be of ordinary box-like shape or it may have any other well known configuration. As will be better understood as this description progresses, the configuration of the standard housing 12 will effect the shape of the substitute reflector 24 as will be described hereinafter.

As is common in fluorescent fixtures of the type designated by the reference numeral 10, there are pairs of original sockets 26, 28, 30 and 32 for each of four original bulbs that are to be located in the spaces designated 34, 36, 38 and 40, respectively. Each of the sockets in the pairs 26, 28, 30 and 32 have two terminals and are slotted to receive complementary pintype connectors commonly found at both ends of standard fluorescent tubes or bulbs. A standard socket of the type commonly found in original sockets of such lighting fixtures 10 is substantially the same as the substitute socket shown in FIG. 7 which will be described in greater detail hereinafter. Suffice it to say at this time, when the fluorescent fixture without modification is employed, four bulbs are located in spaces 34, 36, 38 and 40 and are connected to the respective pairs of sockets 26, 28, 30 and 32 commonly by rotating pin terminals of the original tubes through slots in said sockets to bring them into electrical connection with the terminals therein, whereby to complete an electrical circuit from the building mains 41, through the sockets to the respective fluorescent tubes. This is all old and well known in the art. Commonly, the electrical supply for the pairs of sockets fed from electrical supply mains 41 into a ballast compartment 42 here shown to be running down the center of the fixture 10. Other locations for such ballast compartment 42 may be employed without departing from this invention.

It will be noted that in the fixture 10 the two pairs of bulb spaces 34–36 and 38–40 are spaced apart as is common for placement of original bulbs in unmodified fixtures. In accordance with the present invention, it is intended to substitute for the two bulbs that would occupy the spaces 34 and 36 a single substitute bulb 44 preferably located in the space between the spaces for the original tubes, and to substitute for the two original bulbs that would occupy the spaces 38 and 40 a substitute bulb 46 preferably also located in the in between space. To modify the fixture 10 to achieve this result, the modification apparatus includes the reflector 14, a first pair of devices 50, each of which include a substitute socket 52, a plug 54 for connection in one of the original sockets 26, and a pair of conductors 58 for connecting the terminals of the plug 54 to the terminals of the substitute socket 52 to tap electrical energy supplied to the socket 26 and conduct it to the substitute socket 52. In a standard fluorescent tube this energy tapping and supply is accomplished at both ends of the tube although, with specially configured tubes it could be done with only one energized socket 52 and another non-energized socket at the other end, or in some instances, one pin terminal at each end rather than the usual two at each end. The invention may be employed in either case. Similarly, in a four bulb troffer or housing 12, devices 56 are provided in pairs to also tap the energy from original sockets 32 and to supply it to substitute sockets 58, preferably disposed substantially between original sockets 30 and 32. Energy from the socket 32 is tapped by a plug 60 which is part of the device 56 and a pair of conductors is included in each device 56 to conduct energy from the plug 60 to the respective substitute socket 58. In this manner electricity or electrical energy can be taken off the normal energized original sockets in the fixture 10 and supplied to the substitute sockets disposed between the respective bulb spaces for energizing substitute bulbs 44 and 46.

Having halved the amount of light generated by the bulbs of the fixture, means are provided for intensifying and directing said diminished amount of generated light downwardly to a preferred level at which the lighting level will be substantially equal to the level of four bulbs in an unmodified fixture. This additional light intensification device is a reflector 24, preferably configured to define a paraboloid for each of the substitute bulbs 44 and 46, with the substitute bulbs preferably located substantially at the foci of the two paraboloids defined by the shaped reflector 24. Of course, if it is only a two bulb troffer, then there will be only one substitute bulb and one paraboloidal configured reflector 24 to cooperate therewith.

In accordance with the present invention, a pair of spaced apart hangers is provided for each of the substitute bulbs 44 and 46. Specifically, two spaced apart hangers 62 and 64 are provided for the substitute bulb 44 and a pair of substitute hangers 66 and 68 are provided for the substitute bulb 46. Each of said hangers is connected to and supported by the reflector 24. Each of the hangers includes means for releasably grasping a substitute bulb whereby to releasably hold the associated substitute bulb when connected to the associated pair of hangers 62–64 and 66–68. The reflectors in turn are connected to the housing 12 of the fixture 10. As shown herein, such connection is effected by suitable securing elements such as, for example, self-tapping self-threading screws 70 extending through the flat top portions 71 of reflector and through the flat top of the housing 12. Of course, additional screws may be employed to connect the reflector to other parts of the housing 12, if desired. Thus, it will be seen that the reflector 24 is secured to the fixture housing 12 which supports the reflector. Connected to and supported by the reflector are a pair of brackets, preferably hangers, for each substitute bulb to be employed, here shown as two substitute tubes 44 and 46. The hangers preferably depend from the apex of each paraboloidal reflector portion whereby to locate the associated substitute bulb immediately thereneath paraboloid. The substitute bulbs, here shown as two bulbs 44 and 46, are thus supported by the depending hangers 62, 64, 66 and 68 and not by the sockets which energize them as is common in standard fixtures 10 and in the Gallagher patent previously discussed.

To supply energy to each substitute bulb in the modified fixture, at least one, here shown as two energy tapping devices 72 and 74, are employed. As shown in FIGS. 1 and 2, there are two such devices 72 and 74 for each substitute bulb 44 and 46, respectively. The energy tapping devices 72 and 74 each include a substitute socket 76 for electrical and mechanical connection with the pin terminals 78 of a substitute bulb 44 or 46, a plug 58 and 60 which may be plugged into original sockets 26 and 32, respectively, for tapping electrical energy therefrom, and the pair of conductors 58 for connecting each of the plugs 58 and 60 to each of the substitute sockets 52 and 58, respectively. As shown in FIG. 2, such connections are effected at both ends of the fixture as would be commonly required although, under special circumstances with special apparatus, only one device 72 and 74 might be required to energize a bulb, or in some cases the suitable sockets may have only one terminal per socket.

Figure 5:
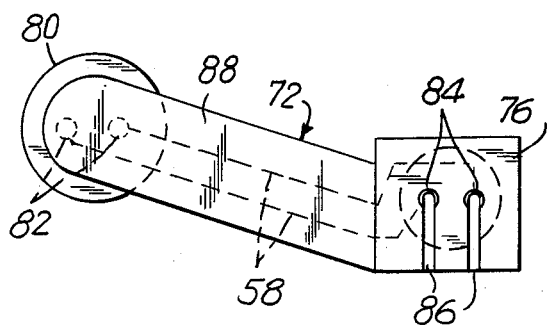
FIG. 5 is a front elevational view of a device for tapping electricity from an original socket in said fixture and for conducting it to a substitute socket therefor.
Figure 6:
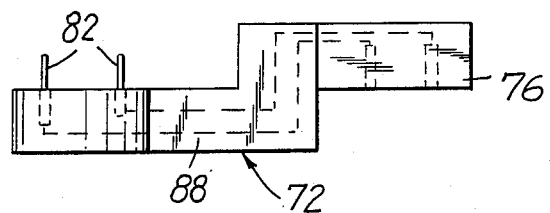
FIG. 6 is a top plan view of the device shown in FIG. 5.

The preferred form of device 72 and 74, here designated as 72 by example and not by way of limitation, is shown in FIGS. 5 and 6 of the drawings. The device 72 includes a plug 80 having a pair of pin terminals 82 which may be brought into electrical and mechanical connection with the terminals in an original socket 26, 28, 30 or 32 in order to tap electrical energy from said original socket for ultimate supply to a substitute bulb 44 or 46. The terminals 82 preferably connect to the terminals in the original socket in the same way as pin terminals in a standard fluorescent bulb or tube will connect to said pin terminals. The device 72 further incorporates a substitute socket 76, which socket has a pair of terminals 84 which are spaced apart so as to electrically and mechanically receive and connect to the pin terminals on the substitute fluorescent tubes or bulbs. Preferably, although not necessarily, the access to the pin terminals on the substitute bulb to the terminals 84 on the substitute socket is afforded by two straight slots 86, each one extending from the periphery of the substitute socket to one of the terminals 84. This permits the substitute bulb to be connected to the terminals 84 of the substitute socket by a straight motion of the bulb relative to the substitute socket, thereby eliminating the twisting type connecting movement commonly involved in connecting a fluorescent bulb to its socket. As already mentioned, a pair of electrical wires 58 connect the pin terminals 82 of the plug 80 to the terminals 84 of the substitute socket 76 to conduct electricity from the terminals 82 to the socket terminals 84 to energize said substitute socket terminals.

In accordance with one of the preferred features of the present invention, the plug 80 is mechanically connected to the substitute socket 76 by a rigid support member 88, preferably molded together with and integrally formed with the plug 80 and the substitute socket 76 so as to form a unified housing made of the plug housing 80, the intervening support connector arm 88 and the substitute socket 76. The support or connector arm 88 has mounted on, and preferably imbedded in it the conductors 58 so as to prevent their ready access from outside which will eliminate any significant code problems with certain municipalities. Also, the rigid support arm 88 will support the substitute sockets 76 a set or predetermined distance from the original socket to which the plug 80 is connected, whereby to prelocate the substitute socket in alignment with its respective substitute bulb that is held by the hangers 62-64 or 66-68. Hence, no screws or other devices are necessary to accurately locate the substitute sockets 76 between the two original bulb spaces 34-36 or 38-40. If desired, the distance between plug 80 and socket may be adjustable as by, for example, making arm 72 out of two or more telescoping pieces, preferably with a set screw to fix them when the distance has been selected.

Figure 7:
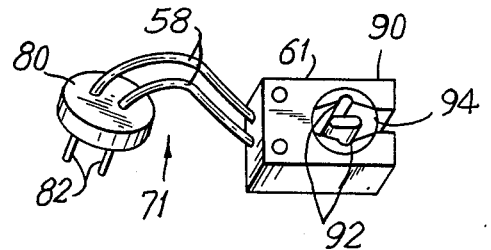
FIG. 7 is a perspective view of an alternate form of device for tapping electricity from an original socket and for conducting it to a substitute socket.

Of course, if desired, a device for energizing a substitute socket from an original socket can be employed that is substantially identical to the device described and claimed in the aforementioned Gallagher patent. Such a device is illustrated in FIG. 7 and includes a plug 80 having a pair of terminals 82 which are connectable to the pin terminals in an original socket of the fixture 10, a substitute socket 90 having a pair of terminals 92 connectable to the pin terminals of an ordinary fluorescent tube or bulb and arcuate slots 94 which enable the substitute bulb to be connected to the terminals 92 by the standard twisting movement normally associated with the connection of a fluorescent tube to a socket. With the bulbs being supported by the hangers 62-64 or 66-68 and not by any substitute sockets, the FIG. 7 device in which there is relative movement permitted between the substitute socket 90 and the plug 80 by the wires 58 which are normally flexible, one can readily connect the plugs 80 to an original socket, and then connect the substitute bulb 44 or 46 to a substitute socket 90 and then mount the substitute bulbs 44 and 46 on their pair of supporting brackets 62-64 and 66-68, respectively.

It will be recognized that the device 72 shown in FIGS. 5 and 6 can have a substitute socket construction like that designated by the reference character 90 in FIG. 7 and the device 79 in FIG. 7 could have a substitute socket like the socket 76 in FIGS. 5 and rather than the substitute socket 90 of FIG. 7. This would be a matter of choice although it is presently preferred in either embodiment to utilize straight slots 86 rather than an arcuate slot construction like the construction 94 in FIG. 7. Alternatively, the FIG. 7 structure, with either a socket 76 or a socket 90, could be further modified as by armoring conductors 58 like, for example, well known BX cable.

As previously stated, the hangers 62, 64, 66 and 68 are all connected to and depend from the reflector 24, preferably in the vicinity of the apex of the paraboloids defined thereby. A preferred hanger and means for connecting it to the reflector 24 are shown in detail in FIG. 3 with respect to one hanger 64 by way of example only. The same construction may be employed with respect to each of the other hangers 62, 66 and 68 as well as to additional hangers if the fixture incorporates more than four original bulbs.

The hanger 64 is essentially U-shaped, having a pair of spaced apart arms 96 and 98 connected by a bight 100 running between the two arms 96 and 98. When connected to the reflector 24, the bight 100 is located above the reflector 24 with the two arms 96 and 98 extending downwardly therefrom through preprovided apertures 102 and 104, respectively. Preferably the hanger is flat in the region 99 in which the bight 100 is located to impart stability to the hanger. The hanger 64 is preferably formed of wire, most preferably resilient wire such as, for example, stainless steel wire, whereby to permit the arms 96 and 98 to be flexed toward and away from one another as may be desired.

In the preferred configuration of the hanger 64 (and the other hangers employed in the apparatus) each arm extends downwardly away from the bight 100 of the bracket in an outward direction as along the portion 106 and 108 of the arms 96 and 98 and it is these two portions 106 and 108 that pass through their respective apertures 102 and 104 in the flat portion 99 of reflector 24. Just below the point at which the arms have passed through the reflector, there is preferably a bend as at 110 and 112 whereby to provide an inwardly directed portion on each of the arms, said portions designated 114 and 116. Portions 114 and 116 terminate immediately above the location of the top of the substitute bulb 44 to be held by the hangers 64. At the bottom of the portions 114 and 116 there is yet another bend 118 and 120 to start defining an outwardly directed portion of the legs 96, 98 herein designated portions 122 and 124 which are provided to conform with the upper portion of the circular periphery of the substitute bulb to be held within the hanger. At the lower point of the portions 122 and 124 there is yet another bend in the bracket, said bends designated 126 and 128, respectively, whereby to provide the bracket 64 with two leg terminal portions 130 and 132 which extend inwardly from the respective bends 126 and 128 to define a lower portion approximately conforming with the lower portion of the periphery of the cylindrical bulb 44. Thus, when a bulb is grasped by the bracket or hanger 64 it will nestle tangent to the portions 122, 124 and 130 and 132 of the legs 96 and 98 so as to be firmly grasped thereby by the inherent resiliency of the hanger. Of course, if desired, other configurations may be employed to shape the arms 96 and 98 so as to approximately or fully conform to the periphery of a substitute bulb or a portion of the periphery thereof for grasping the bulb as shown in FIG. 3.

Figure 4:
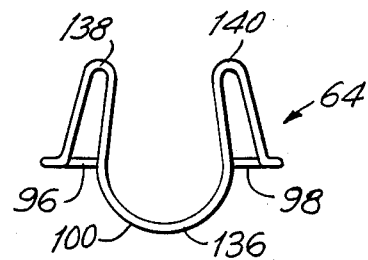
FIG. 4 is a top plan view of the preferred form of bulb hanger.

The bracket 64 is preferably held on the reflector by its own structure. Specifically, and as shown in FIG. 4, the bight 100 of the bracket 64 is provided with a downwardly closed U-shaped portion 136 connected to two upwardly closed U-shaped portions 138 and 140 which are respectively connected to the legs 96 and 98 of the U-shaped bracket 64. Due to the resilient nature of the wire material from which the hanger is made, when the hanger arms are pushed through the apertures 102 and 104 in the reflector 24, they may be pushed downwardly and will flex back and forth to permit the various portions of the legs to pass through the apertures 102 and 104 until the bight 100 rests against the flat upper portion 71 of the reflector 24. Thus the bight 100 prevents any further downward movement of the hanger 64 relative to the reflector 24 and the bends 110 and 112 serve to limit the upward movement of said hanger to prevent inadvertent detachment or upward shifting thereof during use.

In use, when one wishes to modify a standard fluorescent fixture 10 as with the apparatus of the present invention, the original bulbs located at the spaces 34, 36, 38 and 40 are removed from original sockets 26, 28, 30 and 32. Hangers 62, 64, 66 and 68 are attached to a reflector 24 by inserting the legs of the hangers through the apertures 102 and 104 provided therefor, the number of hangers preferably being two for each substitute bulb to be employed in the modified fixture. Thus, if the fixture was originally a four bulb fixture, then there will be two substitute bulbs 44 and 46 and each substitute bulb will have a pair of spaced apart brackets 62–64 and 66–68. After the hangers are connected to the highly reflective reflector 24, the reflector 24 is placed inside of the housing 12 of the fixture 10 and is connected thereto as by screws 70. With the reflectors so located, the hangers already depending from the reflector at the desired locations. If the reflector has a protecting film on it, the film is now removed. If the hangers are already in place, as they preferably are, they will not interfere with the removal of the film. The electricity conducting devices 72 or 79 can then be plugged into the original sockets and the substitute sockets 76 or 90 can be connected to substitute bulbs. The substitute bulbs can be pushed upwardly to engage the shaped lower portions of the legs 96 and 98 of the hanger to be releasably held thereby. Thus the substitute bulbs are supported only by the hangers which in turn are supported only by the reflector 24, the substitute bulb support preferably being independent of the substitute sockets 76 or 90. Thus no screws are required to connect the substitute sockets to the substitute reflectors and the fixture housing 12 for supporting the bulbs, the bulbs supporting the substitute sockets rather than vice versa. This significantly simplifies the modification of the fixture 10 as herein described.

While I have herein shown and described the preferred form of the present invention and have suggested numerous modifications thereto, other changes and modifications may be made therein within the scope of the appended claims without departing from the spirit and scope of this invention.

What is claimed is:

1. A device for modifying a lighting apparatus of the type comprising a housing for at least two spaced apart original elongated tubular bulbs disposable in first and second spaced apart elongated spaces within said housing, a pair of spaced apart original sockets, one for each of said bulbs for conducting electricity from an electric source to said bulbs, said original bulbs being supportable in said housing at least in part by their respective original sockets, said modifying device comprising:
    a reflector secured to said housing, said reflector defining a third elongated space for a substitute elongated tubular bulb in lieu of said two spaced apart original bulbs,
    means for supporting said substitute bulb in said third space, said supporting means being connected to and supported by said reflector;
    a substitute socket for said substitute bulb; and
    means for electrically connecting said substitute socket to one of said original sockets to energize said substitute bulb by said electric source.

2. The device of claim 1, wherein said third space is located between said first and second elongated spaces.

3. The device of claim 1, wherein said means for supporting said substitute bulb comprises a pair of depending spaced apart hangers for holding said substitute bulb in said third space, said hangers being connected to said reflector.

4. The device of claim 3, wherein each of said hangers is releasably connectable to said substitute bulb for releasably holding said substitute bulb.

5. The device of claim 3, wherein each of said hangers is a U-shaped resilient member, said reflector having a pair of spaced apart holes for each hanger, the bight of each U-shaped hanger being disposed above said reflector with the two legs of each hanger extending downwardly through the associated two holes for connecting said hanger to said reflector, the distance between the two legs of each U-shaped hanger when not resiliently deformed being less than the diameter of said substitute bulb, whereby the legs of said hangers can be resiliently deformed away from one another to permit the disposition of a substitute bulb therebetween and then released to grasp and releasably hold said substitute bulb therebetween.

6. The device of claim 5, at least a portion of the legs of said U-shaped hanger being shaped substantially complementary to the periphery of said substitute bulb to facilitate the holding by said hanger of said substitute bulb.

7. The device of claim 6, further comprising means for limiting vertical movement of said hanger relative to said reflector.

8. The device of claim 7, wherein said means for limiting vertical movement of said hangers comprise at least one bend in at least one leg of each hanger.

9. The device of claim 7, wherein said means for limiting vertical movement of said hangers comprise at least one bend in both legs of said hangers.

10. The device of claim 1, wherein said reflector is configured so that the cross sectional shape is paraboloidal.

11. The device of claim 6, wherein said reflector is configured so that the cross sectional shape is paraboloidal.

12. The device of claim 9, wherein said reflector is configured so that the cross sectional shape is paraboloidal.

13. The device of claim 1, wherein said means for connecting said substitute socket to one of said original sockets comprises a plug connected to said original socket, and conductor means electrically connecting said original socket to said substitute socket.

14. The device of claim 13, wherein said substitute bulb includes a pair of pin terminals for electrical connection to said substitute socket, and said substitute socket includes a pair of electrodes engageable with said pin terminals for electrical connection therewith, said substitute socket further having a pair of spaced apart parallel linear slots extending from the periphery of said substitute socket to said terminals, whereby said substitute bulb may be connected to said substitute socket by non-twisting linear movement of said substitute bulb relative to said substitute socket.

15. The device of claim 13, wherein said means for connecting said substitute socket to one of said original sockets comprises a plug connected to said original socket, further comprising a rigid support member for mechanically connecting said plug to said substitute socket.

16. The device of claim 15, wherein said substitute bulb includes a pair of pin terminals for electrical connection to said substitute socket, and said substitute socket includes a pair of electrodes engageable with said pin terminals for connection thereto, said substitute socket further having a pair of spaced apart parallel linear slots extending from the periphery of said substitute socket to said terminals, whereby said substitute bulb may be connected to said substitute socket by non-twisting linear movement of said substitute bulb relative to said substitute socket.

17. The device of claim 15, wherein said rigid support member includes means for supporting said conductor means.

18. The device of claim 15, wherein said conductor means are embedded in said rigid support member.

19. The device of claim 10, wherein said third space is located substantially along the focus of said paraboloidal shaped reflector.

20. A device for modifying a lighting apparatus of the type comprising a housing for four spaced apart original elongated tubular bulbs disposable in first, second, third and fourth spaced apart elongated spaces within said housing, four spaced apart original sockets, one for each original bulb, for conducting electricity from an electrical source to said bulbs, said original bulbs being supportable in said housing at least in part by their respective original sockets, said modifying device comprising:

a reflector secured to said housing, said reflector including fifth and sixth elongated spaces respectively between said first and second spaces and said third and fourth spaces;

said fifth and sixth spaces being for two substitute elongated bulbs in lieu of said four original bulbs;

means for supporting said two substitute bulbs in said fifth and sixth spaces, said supporting means being connected to and supported by said reflector;

a substitute socket for each substitute bulb;

means for electrically connecting one of said substitute sockets to one of said first and second original sockets; and means for electrically connecting the other of said substitute sockets to one of said third and fourth original sockets.

21. The device of claim 20, wherein said means for supporting said substitute bulbs comprise a pair of spaced apart depending hangers for holding each substitute bulb, each of said hangers being a U-shaped resilient member, said reflector having a pair of spaced apart holes for each hanger, the bight of each U-shaped hanger being disposed above said reflector with the two legs thereof extending downwardly through the associated two holes for connecting said hanger to said reflector, the space between the two legs of each U-shaped hanger when not resiliently deformed being less than the diameter of said substitute bulbs, whereby the legs of said hangers can be resiliently deformed away from one another to permit the disposition of a substitute bulb therebetween and then released to grasp and releasably hold said substitute bulb therebetween.

* * * * *